US011165451B1

(12) United States Patent
Denisowski

(10) Patent No.: US 11,165,451 B1
(45) Date of Patent: Nov. 2, 2021

(54) METHOD AND SYSTEM FOR DETECTING PRESENCE OF A BIDIRECTIONAL AMPLIFIER

(71) Applicant: Rohde & Schwarz GmbH & Co. KG, Munich (DE)

(72) Inventor: Paul Denisowski, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 0 days.

(21) Appl. No.: 17/075,436

(22) Filed: Oct. 20, 2020

(51) Int. Cl.
*H04B 1/04* (2006.01)
*H04W 16/28* (2009.01)

(52) U.S. Cl.
CPC .............. *H04B 1/04* (2013.01); *H04W 16/28* (2013.01); *H04B 2001/0408* (2013.01)

(58) Field of Classification Search
CPC .. H04W 16/28; H04B 2001/0408; H04B 1/04
USPC ............ 455/127.1, 63.1, 67.11, 67.13, 67.14
See application file for complete search history.

(56) References Cited

U.S. PATENT DOCUMENTS

| 5,657,326 | A | 8/1997 | Burns et al. |
| 6,353,729 | B1 | 3/2002 | Bassirat |
| 9,414,245 | B2 * | 8/2016 | Bevan ............... H04B 7/0413 |
| 9,698,842 | B2 * | 7/2017 | Gale .................... H04B 1/123 |
| 2010/0164504 | A1 * | 7/2010 | Bradley .............. H04B 17/17 324/520 |

FOREIGN PATENT DOCUMENTS

WO 2013/175194 A2 11/2013

* cited by examiner

*Primary Examiner* — Lee Nguyen
(74) *Attorney, Agent, or Firm* — Christensen O'Connor Johnson Kindness PLLC

(57) ABSTRACT

The present disclosure provides a method for detecting presence of a bidirectional amplifier. At least one radio signal is transmitted by a detection device, the at least one radio signal being a two-tone stimulus. The at least one transmitted radio signal is received by the bidirectional amplifier. The radio signal is processed by the bidirectional amplifier, thereby amplifying the radio signal while generating third order or higher intermodulation products such that an amplified radio signal is generated that includes the third order or higher intermodulation products. The amplified radio signal is transmitted. The amplified radio signal is received by the detection device. The amplified radio signal is analyzed by the detection device, thereby obtaining detection results. Further, a system for detecting presence of a bidirectional amplifier is shown.

18 Claims, 1 Drawing Sheet

METHOD AND SYSTEM FOR DETECTING PRESENCE OF A BIDIRECTIONAL AMPLIFIER

TECHNICAL FIELD

The present disclosure relates to a method for detecting presence of a bidirectional amplifier. Further, embodiments of the present disclosure also relate to a system for detecting presence of a bidirectional amplifier.

BACKGROUND

Bidirectional amplifiers are one of the largest sources of interference in cellular networks. Therefore, it is necessary to detect presence of a bidirectional amplifier, as the bidirectional amplifier may disturb communication within a cellular network. Typically, the bidirectional amplifiers are installed on private properties. The techniques for detecting presence of a bidirectional amplifier known in the state of the art require physical access to the premises in order to identify the bidirectional amplifiers. Accordingly, it is not possible to detect presence of the bidirectional amplifiers by means of the techniques known in the state of the art in case that the private property cannot be accessed.

Therefore, there is a need for a possibility to detect presence of a bidirectional amplifier even though access is not possible.

SUMMARY

The present disclosure provides examples of a method for detecting presence of a bidirectional amplifier. In an embodiment, the method comprises the steps of:

Transmitting at least one radio signal by a detection device, the at least one radio signal being a two-tone stimulus, Receiving the at least one transmitted radio signal by the bidirectional amplifier, Processing the radio signal by the bidirectional amplifier, thereby amplifying the radio signal while generating third order or higher intermodulation products such that an amplified radio signal is generated that comprises the third order or higher intermodulation products, Transmitting the amplified radio signal, Receiving the amplified radio signal with a third order or higher intermodulation products by the detection device, and Analyzing the amplified radio signal with the third order or higher intermodulation products by the detection device, thereby obtaining detection results.

Further, the present disclosure provides examples of a system for detecting presence of a bidirectional amplifier. In an embodiment, the system comprises a detection circuit or device with a transmission antenna configured to transmit at least one radio signal being a two-tone stimulus. The detection device comprises a reception antenna configured to receive an amplified radio signal that comprises third order or higher intermodulation products. The amplified radio signal with the third order or higher intermodulation products is generated by the bidirectional amplifier to be detected. The detection device is configured to analyze the amplified radio signal in order to identify the third order or higher intermodulation products within the amplified radio signal.

The main idea is to identify presence of the bidirectional amplifier while analyzing a radio signal received by the detection device, namely the amplified radio signal transmitted by the (bidirectional) amplifier. The amplified radio signal encompasses the intermodulation products of third or higher order, for instance intermodulation products of fourth order, fifth order and so on. The intermodulation products are generated when amplifying the radio signal, namely the two-tone stimulus, by the bidirectional amplifier.

Since the detection device is enabled to transmit the radio signal and to receive the radio signal amplified by the bidirectional amplifier, namely the amplified radio signal, an over-the-air (OTA) remote detection method or rather OTA remote system is established. The OTA functionality is provided since radio signals are used for detecting presence of the bidirectional amplifier, for instance on a (private) property that may not be accessed. Further, the remote functionality is also provided since radio signals are used that may propagate over a certain distance.

Therefore, physical access to the respective premise(s) for identifying or rather detecting presence of the bidirectional amplifier is not required anymore. Put differently, the method as well as the system ensure the detection of the bidirectional amplifier without requiring physical access to the location at which the bidirectional amplifier is located. Therefore, the over-the-air (OTA) detection allows an unambiguous identification of a bidirectional amplifier.

The method for detecting presence of the bidirectional amplifier as well as the system may be used for interference hunting in order to identify an interference source that may disturb a cellular network, for example communication related to the cellular network.

Generally, two tones, namely the two-tone stimulus, are generated at certain frequencies, wherein the tones are amplified by the bidirectional amplifier located in proximity of the detection device, namely the detection area monitored by the detection device, which transmits the radio signal, namely the two-tone stimulus. The detection device monitors any third order or rather higher intermodulation products that are indicative of the presence of the bidirectional amplifier in the detection area monitored.

Third order or higher intermodulation products are introduced in a two-tone stimulus due to the amplification of the two-tone stimulus by the bidirectional amplifier.

Usually, the third order intermodulation products are close to the fundamentals, namely the original tones. Therefore, these intermodulation products are typically harder to be filtered.

An aspect provides that the two-tone stimulus comprises two tones at distinctive and predefined frequencies. In some embodiments, the stimulus signal, namely the radio signal being the two-tone stimulus, consists of two tones within a cellular uplink band in order to verify if the bidirectional amplifier corresponds to an interference source. In other words, the two tones of the two-tone stimulus are spaced with respect to each other concerning their frequencies, thereby ensuring two distinctive tones. The frequency difference between both tones is predefined, thereby ensuring third order or higher intermodulation products that can be monitored in an unambiguous manner.

The distinctive and predefined frequencies may be within a passband of the bidirectional amplifier. This ensures that the bidirectional amplifier is enabled to process the two-tone stimulus. The passband of the bidirectional amplifier may correspond to a band of the cellular network that may be disturbed by the bidirectional amplifier when acting as an interference source.

Another aspect provides that the third order or higher intermodulation products are within a passband of the bidirectional amplifier. Hence, the intermodulation products can be transmitted by the bidirectional amplifier such that these intermodulation products can be received by the detection device for analyzing purposes, namely for detecting presence of the bidirectional amplifier in the detection area monitored by the detection device.

The two tones of the two-tone stimulus may have the (essentially) same amplitude. Thus, the detection device generates two tones with the same amplitude at different frequencies.

Another aspect provides that the two tones of the two-tone stimulus are varied during the method for detecting presence of the bidirectional amplifier. Hence, the respective distinctive frequencies of the two-tone stimulus are changed during the method for detecting presence of the bidirectional amplifier. This enhances the reliability/confidence in the detection results, as an external signal, namely a signal from an external source, may have a frequency that corresponds to the frequency of a third order or higher intermodulation product. By varying the two-tone stimulus, namely at least one frequency of the two tones, it is ensured that it can be verified whether the signal portion received corresponds to an external signal or rather a real third or higher order intermodulation product.

Furthermore, the amplified radio signal may also comprise the amplified two-tone stimulus. Accordingly, the tones at the distinctive and predefined frequencies are amplified, namely the respective amplitudes, by the bidirectional amplifier. When amplifying the respective tones of the two-tone stimulus, the third order or higher intermodulation products are generated by the bidirectional amplifier.

According to another aspect, the third order or higher intermodulation products in the amplified radio signal are identified when analyzing the amplified radio signal. The intermodulation products are identified since they provide information concerning the presence of the bidirectional amplifier that generates the respective intermodulation products.

Another aspect provides that the detection results are visualized by a visualization apparatus or module. The visualization module may be established by a display or a light source such as a light emitting diode. The detection results, namely the detected presence of a bidirectional amplifier, may visualized by colored lights, graphs, bar charts or similar visualization effects. For instance, the detection results may be highlighted on a map in a visual manner. An operator of the system is enabled to easily identify whether or not a bidirectional amplifier is present in the detection area of the detection device.

The detection results may be processed in real time. Accordingly, a direct feedback is provided such that the operator of the system is informed immediately. For real time processing, the detection results may be fed back to a component of the detection device or rather system. For instance, the visualization of the detection results may be done in real time.

Alternatively, the detection results may be processed in a post-processing. The post-processing can be performed in an automatic manner, for instance by a subsystem of the detection device or rather the entire system. The respective subsystem may relate to a post-processing subsystem. For instance, the visualization of the detection results may be done in a post-processed manner.

Generally, any suitable component of the detection device or rather system may receive the detection results for real time processing or post-processing of the detection results.

Another aspect provides that the at least one radio signal is transmitted by a transmission antenna of the detection device and/or wherein the amplified radio signal is received by a reception antenna of the detection device. Accordingly, the detection device comprises a transmission antenna via which the at least one radio signal is transmitted, namely the two-tone stimulus. The detection device also comprises a reception antenna that is configured to receive the amplified radio signal that is transmitted by the bidirectional amplifier provided that the bidirectional amplifier is present.

The transmission antenna and/or the reception antenna may be established as a directional antenna, for example an omnidirectional antenna. Therefore, the location of the bidirectional amplifier can be detected due to the directional antenna used for transmission and/or receiving purposes. The omnidirectional antenna(s) ensure(s) that localizing the bidirectional amplifier is simplified, as it is not necessary to scan the environment manually, for instance by turning the antenna(s) or rather the detection device.

According to another aspect, the at least one transmitter radio signal is received by a serving antenna connected with the bidirectional amplifier. Additionally or alternatively, the amplified radio signal with the third order or higher intermodulation products is transmitted by a donor antenna connected with the bidirectional amplifier. Therefore, the bidirectional amplifier is connected with the antennas that are used for receiving/transmitting radio signals. In some embodiments, the detection device builds up a communication link with the respective antennas connected with the bidirectional amplifier.

In general, the detection device may comprise a single antenna that can be used in different operation modes, namely in a transmission operation mode and a receiving operation mode. Therefore, a (fast) switching between the operation modes may be provided in order to detect presence of the bidirectional amplifier in the proximity of the detection device by switching from the transmission operation mode into the reception operation mode.

The bidirectional amplifier may be a stationary bidirectional amplifier. Thus, the bidirectional amplifier may be installed on a private property, wherein the bidirectional amplifier is not moving.

The detection device may be mobile. Therefore, interference hunting can be performed easily as the detection device is moved in a certain area in order to identify the presence of the bidirectional amplifier.

Another aspect provides that the system comprises the bidirectional amplifier that is configured to receive the at least one radio signal transmitted by the detection device. The bidirectional amplifier is configured to process the radio signal, thereby amplifying the radio signal while generating third order or higher intermodulation products such that an amplified radio signal is generated that comprises the third order or higher intermodulation products. The bidirectional amplifier is further configured to transmit the amplified radio signal. Hence, the system also comprises the bidirectional amplifier to be detected by the detection device.

Accordingly, the detection device generates the radio signal, namely the two-tone stimulus, that consists of two tones at distinctive and predefined frequencies. The respective tones of the two-tone stimulus may be within a cellular uplink band of a cellular network.

The radio signal is received by the bidirectional amplifier, for example a serving antenna connected with the bidirectional amplifier. The bidirectional amplifier amplifies the radio signal received, namely the two-tone stimulus, thereby generating the third order or higher intermodulation products that are encompassed in the amplified radio signal that is transmitted by a donor antenna connected with the bidirectional amplifier.

The amplified radio signal, which comprises the third order or higher intermodulation products, is received by the detection device, namely a reception antenna of the detection device. The amplified radio signal is analyzed by the detection device after its reception, wherein it is analyzed whether or not third order or higher intermodulation products are present in the amplified radio signal received since these intermodulation products are indicative of the presence of the bidirectional amplifier.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
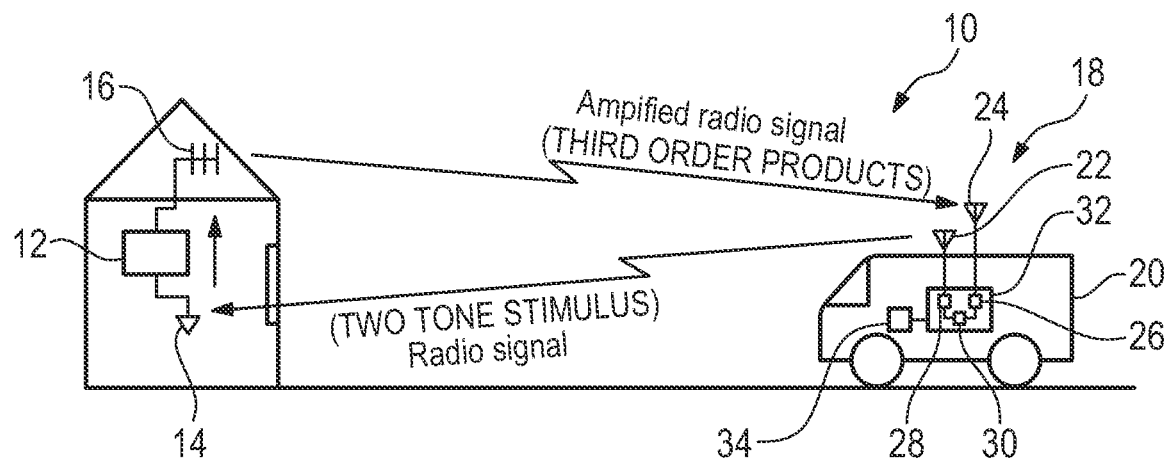
FIG. 1 schematically shows a system for detecting presence of a bidirectional amplifier according to an embodiment of the present disclosure.

In FIG. 1, a system 10 is shown that is used for detecting presence of a bidirectional amplifier 12. The bidirectional amplifier 12 is located on a private property, for instance within a private house as illustrated in FIG. 1.

The bidirectional amplifier 12 is connected with a serving antenna 14 as well as a donor antenna 16. The serving antenna 14 is generally configured to receive a radio signal that is forwarded to the bidirectional amplifier 12 for being amplified, wherein the amplified signal is forwarded to the donor antenna 16 for being transmitted accordingly.

As the bidirectional amplifier 12 is located within the private house, the bidirectional amplifier 12 is illustrated as a stationary one. In a similar manner, the serving antenna 14 as well as the donor antenna 16 are also stationary. However, the antennas 14, 16 may also be established as mobile antennas.

The system 10 further comprises a detection apparatus or device 18 that is located on a vehicle 20 in FIG. 1. Therefore, the detection device 18 is a mobile one since the vehicle 20 may drive in a certain area in order to identify bidirectional amplifiers 12 as will be described later with reference to FIG. 2.

Figure 3A:
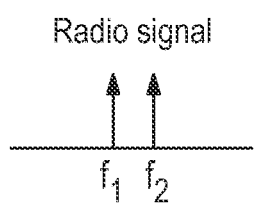
FIG. 3A shows a radio signal being a two-tone stimulus.

The detection device 18 comprises a transmission antenna 22 that is configured to transmit at least one radio signal being a two-tone stimulus. Thus, the radio signal, namely the two-tone stimulus, comprises or rather consists of two tones at distinctive and predefined frequencies. The radio signal transmitted by the transmission antenna 22 of the detection device 18 is illustrated in FIG. 3A, wherein the tones have the frequencies $f_1$ and $f_2$. As shown in FIG. 3A, the two tones of the two-tone stimulus have the (essentially) same amplitude.

The detection device 18 further comprises a reception antenna 24 that is configured to receive a radio signal that may be transmitted by the bidirectional amplifier 12 for analyzing purposes.

The detection device 18 may also comprises an analyzing circuit or module 26 that is connected with the reception antenna 24 in order to analyze a radio signal received via the reception antenna 24.

Moreover, the detection device 18 comprises a signal generator 28 comprised or one or more circuits configured to generate the radio signal, namely the two-tone stimulus, having the two tones at the respective frequencies. The signal generator 28 may be controlled by a control circuit or unit 30 that is connected with the analyzing module 26.

Generally, the analyzing module 26, the signal generator 28 as well as the control unit 30 may together establish a processing sub-system 32 of the detection device 18 or rather the entire system 10.

Furthermore, the detection device 18 comprises a visualization apparatus or module 34 connected with the processing sub-system 32, for example the analyzing module 26. Hence, the visualization module 34 may be used for visualizing any results obtained by the analyzing module 26. The visualization module 34 may be established by a display, for example. In some embodiments, the visualization module 34 may be established by a touch-sensitive display, thereby providing a control interface for an operator via which the operator is enabled to make certain settings, for example settings for the control unit 30 that controls the signal generator 28 accordingly.

Figure 2:
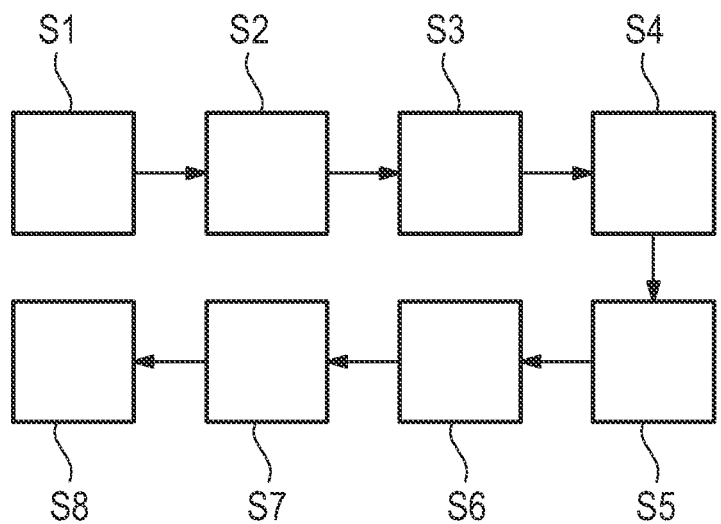
FIG. 2 shows a flow-chart illustrating the steps of a representative method for detecting presence of a bidirectional amplifier according to an embodiment of the present disclosure.

Hereinafter, reference is made to FIG. 2 in order to describe the method for detecting presence of a bidirectional amplifier 12 in the proximity of the detection device 18.

In a first step S1, at least one radio signal is transmitted by the detection device 18, wherein the at least one radio signal is a two-tone stimulus as shown in FIG. 3A. Thus, the radio signal consists of two different tones at distinctive and predefined frequencies, namely $f_1$ and $f_2$. These frequencies are within a passband of the bidirectional amplifier 12 to be detected. In some embodiments, the passband of the bidirectional amplifier 12 corresponds to an uplink band of a cellular network that may be disturbed by the bidirectional amplifier 12.

In a second step S2, the at least one radio signal transmitted is received by the bidirectional amplifier 12, for example the serving antenna 14 connected with the bidirectional amplifier 12. The radio signal is forwarded to the bidirectional amplifier 12 via the serving antenna 14.

In a third step S3, the radio signal received is processed by the bidirectional amplifier 12, thereby amplifying the radio signal, namely the two tones at the distinctive and predefined frequencies, while generating third order or higher intermodulation products such that an amplified radio signal is generated that comprises the third order or higher intermodulation products. The third order or higher intermodulation products are also within the passband of the bidirectional amplifier 12, thereby ensuring that the third order or higher intermodulation products can be forwarded by the bidirectional amplifier 12 accordingly, namely to the donor antenna 16 for being transmitted.

Figure 3B:
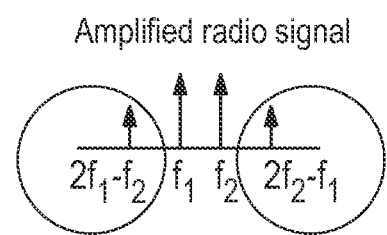
FIG. 3B shows an amplified radio signal encompassing third order intermodulation products obtained after amplifying the radio signal shown in FIG. 3A.

In FIG. 3B, an amplified radio signal is shown, which encompasses the amplified two tones of the radio signal as well as the third order intermodulation products at the frequencies $2*f_1-f_2$ and $2*f_2-f_1$. It is also shown that the amplified radio signal, for example the amplified tones, are amplified in a substantially similar manner, thereby yielding amplified amplitudes of the tones that are (essentially) equal.

In a fourth step S4, the amplified radio signal, namely the amplified tones as well as the third order or higher intermodulation products, are transmitted via the donor antenna 16 connected with the bidirectional amplifier 12.

In a fifth step S5, the amplified radio signal is received by the detection device 18, namely its reception antenna 24. The amplified radio signal comprises the third order or higher intermodulation products provided that the amplified radio signal has been generated by the bidirectional amplifier 12.

In a sixth step S6, the amplified radio signal is analyzed by the analysis module 26 of the detection device 18, thereby obtaining detection results.

In some embodiments, the analysis is based on detecting third order or higher intermodulation products within the amplified radio signal, as these intermodulation products are indicative of the presence of the bidirectional amplifier 12 in the proximity of the detection device 18, namely a detection area monitored by the detection device 18.

In a seventh step S7, the detection results may be visualized by the visualization module 34 that is part of the system 10, for example the detection device 18. Thus, an operator of the system 10 or rather the detection device 18 is graphically informed about the presence of the bidirectional amplifier 12 in the proximity of the detection device 18. For instance, the visualization may be done in real time such that the operator is informed immediately. Alternatively, the visualization may be done in a post-processing of the detection results.

Generally, the detection results may be processed by any other component of the detection device 18 or rather the system 10 in real-time or rather in a post-processing. Hence, a feedback line or rather a post-processing subsystem may be provided.

In an eighth step S8, the two tones of the two-tone stimulus may be varied in order to enhance the reliability of the method for detecting presence of the bidirectional amplifier 12.

However, the respective frequencies of the two tones are still distinctive and within the passband of the bidirectional amplifier 12. By varying at least one tone of the two-tone stimulus, for example its frequency, it is avoided that a signal received from an external source at a frequency corresponding to the third order or higher intermodulation product is deemed erroneously to relate to a third order intermodulation product.

For varying the frequency or rather frequencies of the two-tone stimulus, the control unit 30 controls the signal generator 28 accordingly.

In some embodiments, the control unit 30 is connected with the analyzing module 26. Hence, the control unit 30 may receive the detection results from the analyzing module 26, which indicate presence of a bidirectional amplifier 12 in the proximity of the detection device 18.

The control unit 30 processes this information such that the signal generator 28 is controlled to generate a (second) radio signal having two different tones compared to the previously generated radio signal, namely the first radio signal. In some embodiments, it might be sufficient to generate a two-tone stimulus that comprises only one tone at a different frequency compared to the frequencies used previously. Accordingly, the (second) radio signal is used to verify the preliminary detection result indicating the presence of the bidirectional amplifier 12 in the proximity.

In general, the transmission antenna 22 and/or the reception antenna 24 may be established as directional antennas, for example omnidirectional antennas. Thus, the location of the bidirectional amplifier 12 can be identified as well.

Hence, interference hunting may be performed appropriately, as the location of the interference source, namely the bidirectional amplifier 12, can be identified.

Therefore, the system 10 and the method ensure that a bidirectional amplifier 12 can be identified or rather detected over-the-air (OTA) without having physical access to the bidirectional amplifier 12. Therefore, the presence of a bidirectional amplifier 12 on a private property can be detected easily by the method and the system 10.

Certain embodiments disclosed herein utilize circuitry (e.g., one or more circuits) in order to implement standards, protocols, methodologies or technologies disclosed herein, operably couple two or more components, generate information, process information, analyze information, store information, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for detecting presence of a bidirectional amplifier, the method comprising:
   transmitting at least one radio signal by a detection device, the at least one radio signal being a two-tone stimulus;
   receiving the at least one transmitted radio signal by the bidirectional amplifier;
   processing the radio signal by the bidirectional amplifier, thereby amplifying the radio signal while generating third order or higher intermodulation products such that an amplified radio signal is generated that comprises the third order or higher intermodulation products;
   transmitting the amplified radio signal;
   receiving the amplified radio signal with the third order or higher intermodulation products by the detection device; and
   analyzing the amplified radio signal with the third order or higher intermodulation products by the detection device, thereby obtaining detection results.

2. The method according to claim 1, wherein the two-tone stimulus comprises two tones at distinctive and predefined frequencies.

3. The method according to claim 2, wherein the distinctive and predefined frequencies are within a passband of the bidirectional amplifier.

4. The method according to claim 1, wherein the third order or higher intermodulation products are within a passband of the bidirectional amplifier.

5. The method according to claim 1, wherein the two tones of the two-tone stimulus have the essentially same amplitude.

6. The method according to claim 1, wherein the two tones of the two-tone stimulus are varied during the method for detecting presence of the bidirectional amplifier.

7. The method according to claim 1, wherein the amplified radio signal also comprises the amplified two-tone stimulus.

8. The method according to claim 1, wherein the third order or higher intermodulation products in the amplified radio signal are identified when analyzing the amplified radio signal.

9. The method according to claim 1, wherein the detection results are visualized by a visualization apparatus.

10. The method according to claim 1, wherein the detection results are processed in real time.

11. The method according to claim 1, wherein the detection results are processed in a post-processing.

12. The method according to claim 1, wherein the at least one radio signal is transmitted by a transmission antenna of the detection device and/or wherein the amplified radio signal is received by a reception antenna of the detection device.

13. The method according to claim 12, wherein at least one of the transmission antenna and the reception antenna is established as a directional antenna.

14. The method according to claim 1, wherein the at least one transmitted radio signal is received by a serving antenna connected with the bidirectional amplifier and/or wherein the amplified radio signal with the third order or higher intermodulation products is transmitted by a donor antenna connected with the bidirectional amplifier.

15. The method according to claim 1, wherein the bidirectional amplifier is a stationary bidirectional amplifier.

16. The method according to claim 1, wherein the detection device is mobile.

17. A system for detecting presence of a bidirectional amplifier, the system comprising a detection device with a transmission antenna configured to transmit at least one radio signal being a two-tone stimulus, the detection device further comprising a reception antenna configured to receive an amplified radio signal that comprises third order or higher intermodulation products, wherein the amplified radio signal with the third order or higher intermodulation products is generated by the bidirectional amplifier to be detected, and the detection device being configured to analyze the amplified radio signal in order to identify the third order or higher intermodulation products within the amplified radio signal.

18. The system according to claim 17, wherein the system comprises bidirectional amplifier that is configured to receive the at least one radio signal transmitted by the detection device, the bidirectional amplifier being configured to process the radio, thereby amplifying the radio signal while generating third order or higher intermodulation products such that an amplified radio signal is generated that comprises the third order or higher intermodulation products, the bidirectional amplifier being further configured to transmit the amplified radio signal.

* * * * *